United States Patent [19]

Zulian et al.

[11] Patent Number: 4,631,667
[45] Date of Patent: Dec. 23, 1986

[54] ASYNCHRONOUS BUS MULTIPROCESSOR SYSTEM

[75] Inventors: Ferruccio Zulian, Cornaredo; Vittorio Zanchi, Milan, both of Italy

[73] Assignee: Honeywell Information Systems Italia, Milan, Italy

[21] Appl. No.: 507,854

[22] Filed: Jun. 27, 1983

[30] Foreign Application Priority Data

Jul. 6, 1982 [IT] Italy .............................. 22248 A/82

[51] Int. Cl.⁴ ............................................. G06F 13/00
[52] U.S. Cl. .................................................... 364/200
[58] Field of Search ... 364/200 MS File, 900 MS File

[56] References Cited

U.S. PATENT DOCUMENTS 3,949,372  4/1976  Brioschi .............................. 364/200
4,302,808  11/1981  Zanchi ................................. 364/200

Primary Examiner—Raulfe B. Zache
Assistant Examiner—Emily Yue Chan
Attorney, Agent, or Firm—Nicholas Prasinos; John S. Solakian

[57] ABSTRACT

An asynchronous bus multiprocessor system where a plurality of microprogrammed processors communicate with a working memory through a common bus. Microinstructions are read out from working memory. At least one of the processors, in addition to conventional bus interface registers for latching of data, address and commands to be forwarded to the working memory through the bus, is provided with an additional interface register, devoted to the latching of a microinstruction address for a microinstruction to be read out from the working memory. The system is further provided with a multiplexer for selectively loading a microinstruction register either from a microprogram control memory or from the system common bus, via a direct path established between the system common bus and an input set of the multiplexer. The microinstruction transfer speed from working memory to the processor is further enhanced by means of different timing for the data transfer through the bus and the microinstruction transfer through the bus. In the case of data transfer a bus access cycle is started at the end of the processor cycle during which the relevant bus interface register is loaded. In the case of microinstruction read out from working memory, the additional interface register is loaded at the beginning of a processor cycle concurrently with the request of bus access cycle, so that the two overlap.

6 Claims, 11 Drawing Figures

ASYNCHRONOUS BUS MULTIPROCESSOR SYSTEM

BACKGROUND OF THE INVENTION

The present invention relates to an asynchronous bus multiprocessor system with microinstructions being loaded from a working memory. Data processing systems are known where a plurality of processors each have a control memory intended to store microprograms, such microprocessors communicating with each other and with a working memory through a common bus. The working memory contains programs, data and microprograms. The control memory of each processor is actually comprised of two independent control memories; a read only memory and a read/write memory. Microprograms which reside in the working memory can be used after transfer of such microprograms in the control read/write memory. Such transfer is made by means of a microprogram resident in the control read only memory. An example of such architecture is described in U.S. Pat. No. 3,478,322. It is however restricted to the case of a monoprocessor system.

Microprogrammed systems are further known where the working memory is integral to the central unit and is synchronized with it. In such systems it is possible to read out and execute microinstructions contained in the working memory one at a time. An example of such system is disclosed in British Pat. No. 1,440,856. In these systems the use of the working memory as control memory and the interface problems in memory access are solved by the use of a so-called hardware sequencer which is activated for read out, and by executing a microinstruction resident in the working memory. Such sequencer, when activated, generates a series of microinstructions to control the system operation during several machine cycles, as necessary to read out from working memory the resident microinstruction and to execute such microinstruction in case it requires a read memory operation. Such systems are more efficient than the previously mentioned ones because only those microinstructions are transferred from the working memory which are actually needed, with a so-called "hot" reading and execution process; i.e., by individual request of microinstructions and related immediate execution. It is desirable that this type of solution be also applied to multiprocessor systems connected to each other and to a working memory via a common bus in order to obtain the same advantages. However the adoption of such solution to multiprocessor systems presents great difficulties and there are no examples in the art of which the applicants are aware. In bus multiprocessor systems the bus is shared by the several processors in different time slots. Additionally the operation of each processor is carried out in a completely asynchronous way with respect to the other processors and the working memory. Each processor operates substantially on the basis of machine cycles, while the working memory and the bus operate on the basis of memory cycles which are related to a bus cycle. The processor cycles are neither synchronized to each other nor to the bus cycles. Moreover, processor cycles are generally shorter than bus and memory cycles.

A synchronization mechanism is therefore necessary to enable the interface between a processor and the memory through the bus and to prevent possible interferences among processors in communicating with memory. Such synchronization mechanism requires that each processor be provided with registers interfacing to the bus and with logic to hold the information which is to be exchanged with memory during the time necessary for synchronization and dialog. Therefore a memory access operation; e.g., a read operation, functionally requires three separate operations which are developed in at least two machine cycles and in one bus cycle. During a first machine cycle some commands and a memory address are arranged within the interface register. At the end of the cycle a bus access and a read memory request is set and the requesting processor must stop each activity and wait for the read out information. Therefore a wait-pause starts when the bus and memory control apparatus responds to the request with its own decisional criteria and with its own timing; this starts a dialog with the register and the interface logic of the processor. During this time the processor stays inactive. This involves at least a bus cycle development at the end of which the information read out from memory is loaded into an interface register of the processor and the processor can start again with its activity. At this point in a second machine cycle, the information contained in the interface register may be transferred to a working register for handling, if required. Accordingly the concept disclosed in the mentioned British patent if applied to a multiprocessor system would require three machine cycles and a bus cycle for the execution of a working memory resident microinstruction. In a first machine cycle the interface register loading occurs. In a bus cycle the memory access operation and the loading of the read out microinstruction into an interface register occur. In a second machine cycle a microinstruction register is loaded; whereas in a third machine cycle the microinstruction is executed. It is clear that such operations can only be carried out under control of a sequencer and it is also clear that the operation of the system takes place in a very slow way. A further reduction in speed is caused by the interference among operations of memory access, and read-out from memory of the microinstruction stored therein. Normally, in a microprogrammed processor, a microinstruction execution overlaps with the fetching of the subsequent microinstruction in one machine cycle. Such overlapping cannot take place when the executed microinstruction commands a memory access and the subsequent microinstruction is stored in the working memory. Accordingly the teaching of the subject British patent when applied to the execution of a memory access microinstruction and the fetching of the subsequent microinstruction from the working memory would require at least three machine cycles and two bus cycles as follows:

(1) machine cycle: loading of the interface registers with memory address and related read/write commands.

bus cycles: read/write memory.

(2) machine cycle: loading of interface registers with microinstruction address in working memory and related read command.

bus cycle: read memory.

(3) machine cycle: transferring of the microinstruction from interface register to microinstruction register.

A microinstruction execution cycle would then follow these cycles.

OBJECTS OF THE INVENTION

It is an object of the invention to provide an improved asynchronous multiprocessor system.

It is a further object of the present invention to remedy inefficiencies described supra. For this purpose a multiprocessor system with asynchronous bus is provided where microinstructions are fetched from a working memory, one at a time, and where execution inefficiency and additional circuitry required for microinstruction fetching are reduced to the minimum.

SUMMARY OF THE INVENTION

In summary, the processor reads out from working memory one microinstruction at a time and executes it directly thereafter without loading such microinstruction or a sequence thereof in a read/write control memory. In particular, the transfer operation of a working memory microinstruction in a processor register through the bus is directly carried out without requiring machine cycles in addition to the transferring one. Additionally the loading of the information necessary for the addressing of the working memory and for the reading out of the microinstruction are carried out at the beginning of a machine cycle. Moreover the related access request to the bus is carried out at the beginning of a machine cycle; consequently the following bus cycle for reading out the microinstruction from the working memory completely overlaps the machine cycle. Great advantage is therefore obtained in operating speed of the system. These advantages are obtained by the combined use of a hardware sequencer, for the generation of a plurality of microcommand sets, each set controlling a machine cycle, of a cyclical timing unit which is able to interrupt its activity of a direct communication path between the system bus and a microinstruction register, and by the farther use of a subsidiary interface register for the addresses of microinstructions stored in working memory.

BRIEF DESCRIPTION OF THE DRAWINGS

These and other features of the invention will appear more clearly from the following description of a preferred embodiment and from the enclosed drawings where.

DETAILED DESCRIPTION OF THE PREFERRED EMBODIMENT

Figure 1:
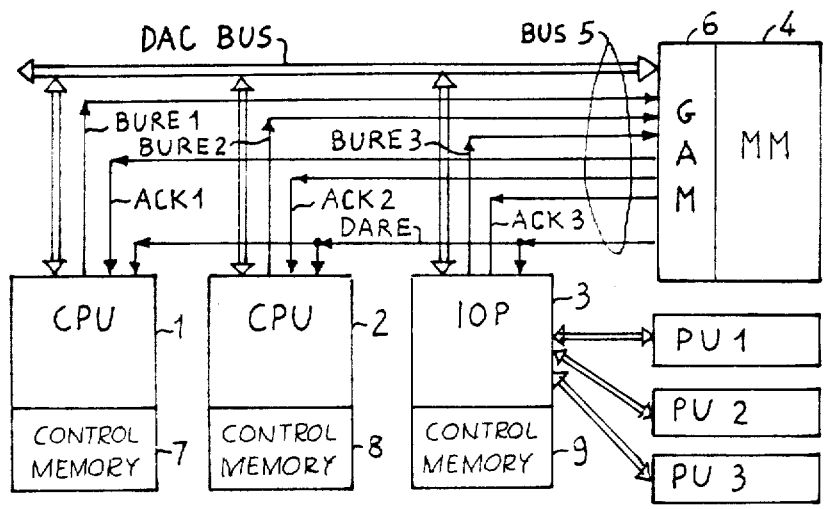
FIG. 1 shows a block diagram of a multiprocessor system with asynchronous bus.

Referring to FIG. 1, three processors 1, 2, 3 communicate with a working memory 4 through a set of leads of BUS 5 and a memory access control unit of GAM 6 coupled to memory 4. The processor may be both central processing unit CPU, such as processors 1, 2, as well as input/output IOP, such as processor 3. An IOP processor is connected to and controls a predetermined number of peripheral equipments PU1, PU2, PU3 as, for instance, disk units, tape units, printers, card readers, etc. A control memory, respectively 7, 8, 9, is coupled to each processor. The control memory is preferably a read only memory and is designed to store the microprograms of the several processors. According to the invention, at least one of the processors (but preferably each processor for architecture homogeneity sake) is provided with an architecture which enables it to fetch and execute microinstructions stored in working memory 4. BUS 5 comprises a predetermined number of leads, for instance 32, devoted to the bidirectional transfer of information (DATA, ADDRESSES, COMMANDS). These leads, named DAC BUS, connect the several processors with each other and with GAM 6 by a bus connection. On these leads, data comprised of 32 bits or an address of 24 bits and a command of 8 bits may be present at different times. The use of the same leads to transfer different kinds of information at different times is adopted to reduce the number of leads. BUS 5 further includes leads BURE 1, BURE 2, BURE 3, each one connecting one of the processors 1, 2, 3 with GAM 6 to send it a BUS access request. Leads ACK1, ACK2, ACK3 each connect GAM 6 respectively to processors 1, 2, 3 to send them a BUS granted signal and a common lead, DARE connects the processors and GAM 6 to enable GAM 6 to send to the processors a DAta REady signal for data read out from memory on the DAC BUS, or for data accepted by the memory, as the case may be. As the DAC BUS lead set is common to all the processors and to the GAM, it is necessary to avoid the placing of information on such leads at the same time by the several processors or the working memory. Therefore a BUS occupation is always preceded by an access request sent by the several processors and by an accepted request answer sent by the GAM. The GAM resolves the conflicts among several access requests sent by the processors. Each processor performs in a completely autonomous way vis-a-vis the other processors during machine cycles determined by a timing unit in each of the processors. The working memory read/writes information during its own memory cycle which is independent from the one of the several processors. Thus the system is an asynchronous one. Each time a processor wants to exchange information with the memory, synchronization has to occur.

Figure 2:
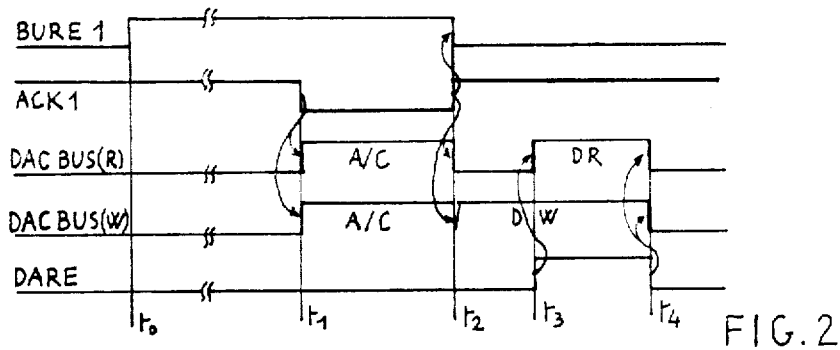
FIG. 2 shows a timing diagram of the dialog which develops in the asynchronous bus of FIG. 1.

Referring now to FIG. 2, there is shown the timing diagram of the dialog occurring on BUS 5. For clarity, the signals in FIG. 2 are identified by the same reference name of the lead or lead set which transfers them. Processor 1 rises BURE signal to logical level 1 at a time $t_0$, about the end of one of its machine cycles. In so doing, it communicates to GAM 6 that it wants access to the BUS for a read/write memory operation. Generally it further stops any activity and waits for an answer. After a certain wait time, GAM 6 answers dropping ACK1 to logical level 0 (instant $t_1$). This wait time depends on whether memory 4 is carrying on a read/write operation or the BUS has been granted other processors owing to access requests with priority higher than the one of BURE 1 and contemporaneous to BURE 1. The falling of ACK1 to logical level 0 signals to processor 1 that it can have access to the BUS. On receipt of the first ACK1 edge, processor 1 places information on the DAC BUS, which information relates to a memory address plus some commands (A/C). This occurs both in case of read memory operation (DAC BUS diagram (R)) and in the case of write operation (DAC BUS diagram (W)). This information is transferred from GAM 6 to memory 4 which is activated. With the second edge of signal ACK1 (time $t_2$) processor 1 drops its BURE 1 request to 0 and removes the information (memory address and commands A/C) from BUS 5. If the operation required by processor 1 is a write operation, data to be written into memory (DW) is put on the BUS 5. After a time interval, determined by the memory cycle, in the case when the required operation is a read operation, GAM 6 puts the information read out from memory (DR) on BUS 5 and rises signal DARE. The first edge of DARE (time $t_3$) received by processor 1 indicates that the DR information present on DAC BUS may be loaded into an interface register. Once received by processor 1 the second edge of DARE (time $t_4$) indicates, in the case of a write operation, that the data to be written has been transferred to memory and must be removed from the DAC BUS. It further restarts processor 1 which was generally locked. In the case of read out operation the read out data DR is removed from DAC BUS at time $t_4$ which then terminates the BUS and memory cycle. After time $t_4$, a new cycle of BUS access and a corresponding memory cycle may start. (An example of memory access control unit such as GAM 7 is described in U.S. Pat. No. 4,365,291.)

More particularly, FIG. 1 shows an access control unit which receives three signals BURE 1, BURE 2, BURE 3 and generates an answer corresponding to ACK1, ACK2, ACK3 on the same lead used for BURE signal reception. It further generates a signal ENCY, corresponding to signal DARE. From the above description it clearly appears that the BUS dialog is exclusively controlled and timed by GAM 6 according to the memory cycle. Therefore the BUS cycle and the memory cycle substantially coincide. The memory cycle is generally longer than the machine cycle of the several processors. It is the processor operation, that is the machine cycle of the processors, which is synchronized with the memory cycle through signal DARE. Additionally as it will appear more clearly in the following description, the information transfer in a BUS cycle only occurs between the memory and the interface registers of the several processors.

Figure 3:
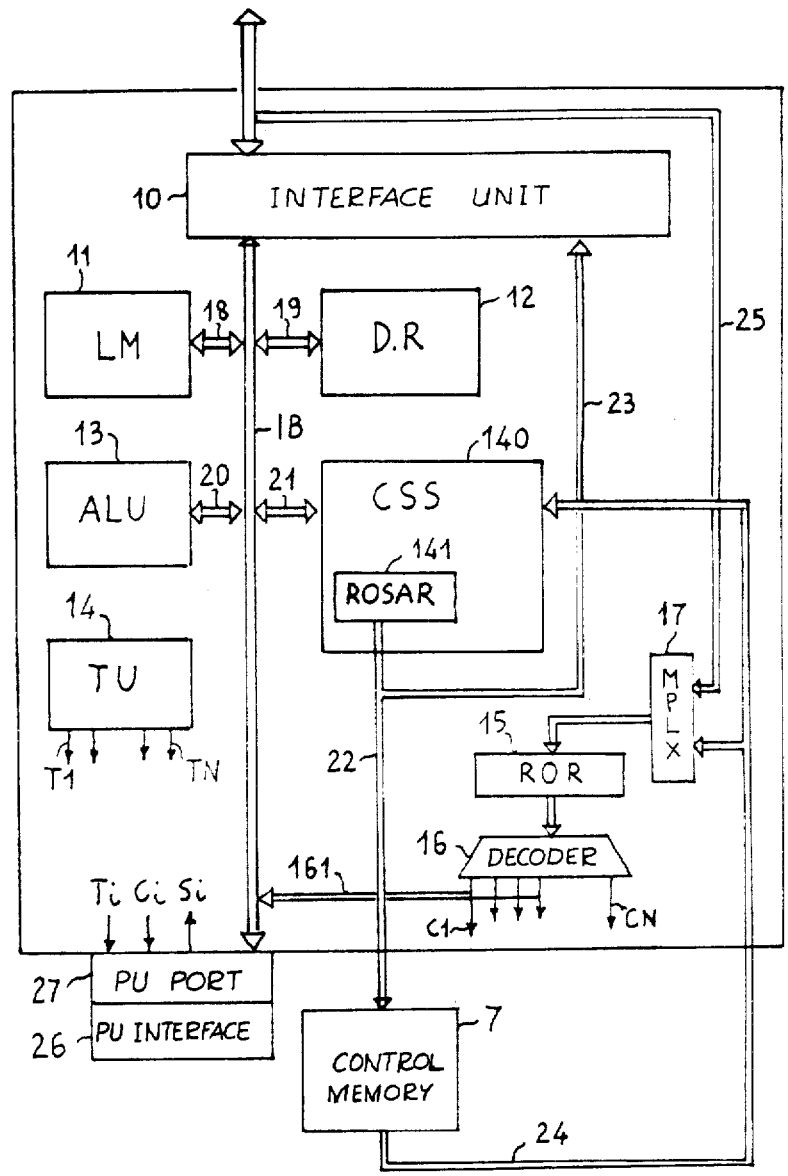
FIG. 3 is a block diagram of a processor for a multiprocessor system designed according to the present invention.

Referring now to FIG. 3, there is shown the block diagram of a processor, such as processor 1, and the related control memory 7. The processor comprises an interface unit 10 which connects the processor with the system BUS, a first register set 11 which can be used as local working memory LM, a second internal or direct register set DR 12, a logical/arithmetical unit ALU 13, a timing unit 14, a control memory sequencer CSS 140, a microinstruction register ROR 15, a microinstruction decoder 16 and a multiplexer MPLX 17. An internal BUS IB, with parallelism of 32 bits, enables the exchange of information among the several processor elements. Local memory LM 11 receives from or transfers to the internal BUS the information stored in its register, through BUS 18. Direct registers DR 12 communicate with the internal BUS through bidirectional BUS 19. Unit ALU 13 communicates with the internal BUS through bidirectional BUS 20. Control memory sequencer 140 receives information from the internal BUS IB through BUS 21 and it transfers, through BUS 22, a read address to control memory 7, which is a 32K microword memory, and stores 32 bit words in parallel.

The same address is sent to interface unit 10 through BUS 23. The microinstructions read out from the control memory one at a time are transferred through BUS 24 and multiplexer 17 to microinstruction register ROR 15. The outputs of register ROR 15 are connected to the inputs of decoder 16 which decodes the microinstruction stored in register 15 in a set of elementary commands $C_1$, $C_2$, $C_N$. A BUS 161 enables the transfer of a predetermined number of elementary commands on a predetermined number of leads of the internal BUS IB. For the purpose of the present invention it suffices to point out that the decoding network generates the following commands:

VMM: elementary command which specifies that the operation to be carried out during the cycle is a working memory access command (through the system bus)

R: elementary command which defines that a memory access operation is a read operation. Absence of such command indicates the operation is a write operation.

CDO: elementary command which specifies that one of the operations to be carried out during the cycle is the information loading into a suitable register of the interface unit.

TR: elementary command which specifies that one of the operations to be carried out during the cycle is the read out of information from a suitable register of the interfacve unit.

BUS 24 further enables the transfer of the read out microinstructions, or part thereof, to control memory sequencer 140. BUS 25 allows the transfer of information present on DAC BUS to register ROR 15 through multiplexer 17. Timing unit 14 generates its outputs timing signals T1, TN. Timing signals T1 . . . TN and commands C1 . . . CN are distributed to the several elements of the processor allowing the timed control of it. The timing and control network, through which the several signals T1, TN, C1 are transferred, is not shown because it is not necessary to the understanding of the invention. In case the processor is an input/output processor, it is also supplied with a connection interface PU PORT 27 for the connection of the peripheral units through an interface adapting logic 26. Connecting interface PU PORT 27 connects the internal BUS IB to logic 26 for the bidirectional transfer of information. It further enables the transfer of timing signals Ti and control signals Ci to peripheral unit 26 for the peripheral unit control as well as the reception of signals Si from peripherals PU. A detailed description of the several elements constituting the processor is not essential for the purposes of the invention; such description is therefore limited to the elements which are peculiar to the invention, particularly timing unit 14, interface unit 10 and multiplexer 17. Local memory 11, direct register 12 and control memory 7 are conventional elements, well known to people skilled in the art. Even arithmetic unit 13 and control sequencer 140 are elements well known to people skilled in the art. They are available as integrated circuits, as for example AM 2901 and AM 2909 circuits, marketed by the U.S. firm, American Micro Devices, AMD. Detailed information about the use of such circuits and processor design, as well as information about support registers and memories, can be found in the manual "Bipolar Microprocessor Logic and Interface Data Book", 1981, Advanced Micro Devices. It is to be noted that sequencer CSS 140 is provided with a support register ROSAR 141; such register includes at each machine cycle the address of the subsequent microinstruction. The content of such register is updated during each machine cycle according to the executing microinstruction. For instance, it may be incremented by 1 (sequential microinstruction), by a quantity K received through one of buses 21, 24 (relative jump microinstruction) or a new address received through buses 21 or 24, may be substituted (absolute jump microinstruction).

Figure 4:
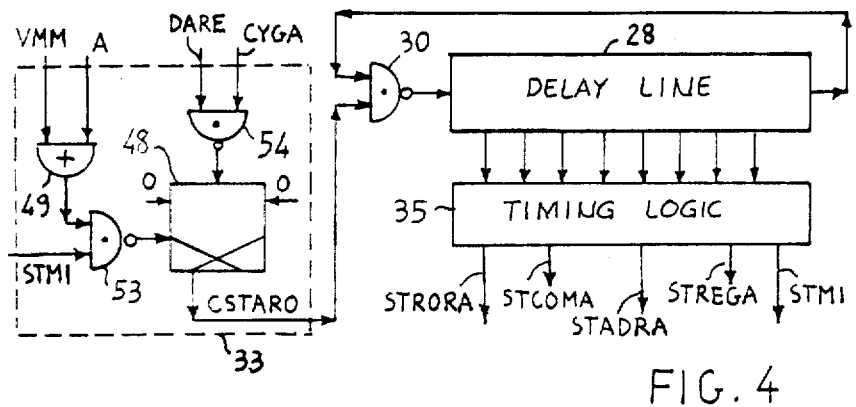
FIG. 4 is a block diagram of a timing unit for the processor of FIG. 3.

Referring now to FIG. 4, a delay line 28 with several output taps, an AND gate 30, a START/STOP logical block 33 and a timing logic 35 comprise the timing unit 14. The end output of delay line 28 is connected to a first input of NAND gate 30. A control signal CSTARO output from logical block 33 is applied to a second input of NAND 30. The intermediate taps of the delay line are connected to the corresponding inputs of timing logic 35. The timing operates as follows:

When the unit is not activated, control signal CSTARO is at logical/electrical level 0 and the delay line is loaded; i.e., all its outputs are at logical/electrical level 1. When control signal CSTARO rises to logical level 1, the output of NAND gate 30 falls to logical level 0 and a transition edge from 1 to 0 propagates along line 28; i.e., line 28 discharges. When the end output of line 28 falls to logical level 0 the output of NAND gate 30 rises to logical level 1 and the line charges again. When the end output of line 28 rises to logical level 1 the line is charged to the same initial condition and a timing cycle is completed. If signal CSTARO is at logic level 1, line 28 discharges again and a new timing cycle starts. It is clear that in case CSTARO is at logic level 1 the delay line goes on cyclically discharging and charging with a cycle having a duration equal to 2Δ, where Δ is the propagation time of line 28. The cycle comprises a first discharging phase and a second charging phase of equal duration. If CSTARO falls to logic level 0 before the end of a cycle, however during the charging phase, the subsequent timing cycle is not started. In conclusion, the timing unit is able to generate a continuous sequence of timing cycles of a duration equal to 2Δ according to the logic level of control signal CSTARO and to introduce a pause between a cycle and the start of the subsequent one (control signal CSTARO). Timing logic 35 is comprised of a range of logical elements AND, OR, NOT which, by suitably combining the signals present at the intermediate outputs of the delay line, enable timing signals of preestablished duration suitably spread within the timing cycle. Stop logic 33 will be considered later.

Figure 5:
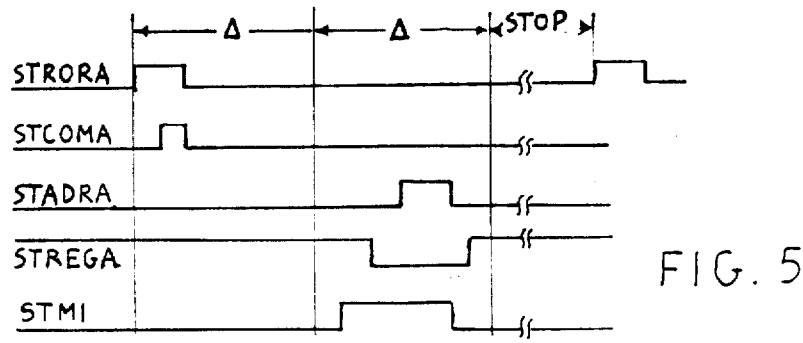
FIG. 5 is a timing diagram for the timing signals generated by the timing unit of FIG. 4.

Referring now to FIG. 5, the timing diagram of some timing signals generated by the timing unit, which are useful for understanding the invention are shown. Signal STRORA, generated at the beginning of a cycle, is used as a clock for the loading of a microinstruction, read out from the control memory 7, in microinstruction register ROR 15. Signal STCOMA is used for validation of output commands from decoder 16. Signal STADRA is used as a synchronization clock for stop logic 33 (as will be seen infra) and enables the drop to 0 of signal CSTARO during the charging phase. Signal STREGA is used as read/write clock and input/output enabling for local memory registers, direct registers and ALU. Signal STMI is a clock signal for the loading of registers included in the interface unit 10. FIG. 5 shows that a processor timing cycle having a duration of 2 is followed by a stop interval (STOP) of variable duration in case of a null before the beginning of the subsequent cycle. The STOP interval enables the processor timing cycle to synchronize with external events, not dependent on the processor; for instance, events occurring in the system BUS which, as already said, operate asynchronously with the processors.

Figure 6:
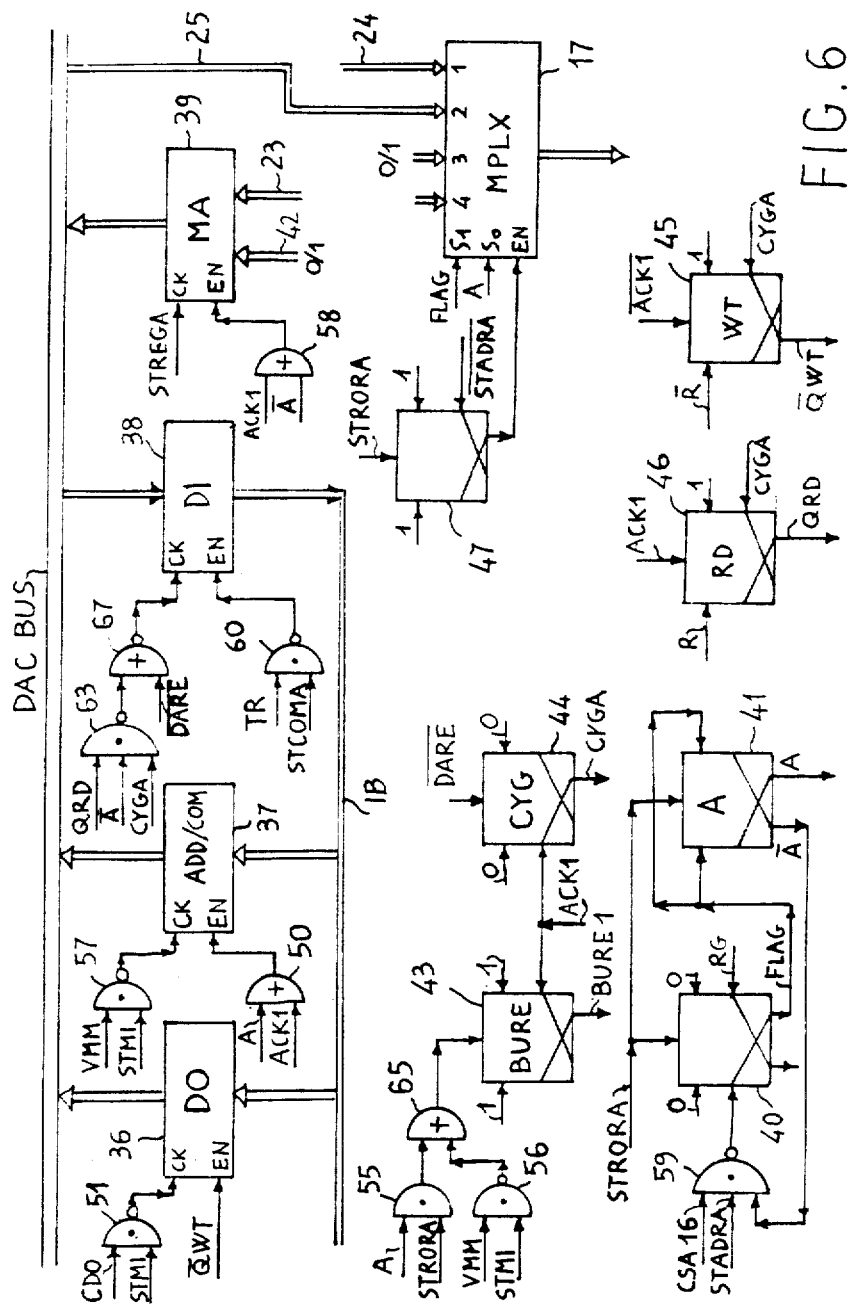
FIG. 6 is a detailed diagram of the interface unit of the processor of FIG. 3.

Referring now to FIG. 6, unit 10 comprises 4 interface registers with 32 bits parallelism 36, 37, 38, 39 respectively, flip-flops 40, 41, 47, 43, 44, 45, 46, OR gates 50, 65, 58, AND gate 55, NAND gates, 51, 57, 56, 59, 60, 63 and NOR gate 67. (Possible NOT elements for the inversion of signals are not shown as their use is obvious.) The interface registers may be formed by integrated circuits of the kind available on the market with code 74S374. These are registers provided with a clock input CK and with a control input EN for enabling output. The information present at the register inputs are loaded when a transition from level 0 to 1 is applied to the clock input. The register outputs are enabled in case a level 0 is applied to input EN. Otherwise the outputs are in a state of virtually infinite impedance. The interface flip-flops may be integrated circuits of the kind available on the market with code 74S109. These are flip-flops of JK type enabled by a positive edge (from 0 to 1) applied to the clock input. The following table describes their behaviour:

| S | R | $C_K$ | J | K | Q | $\overline{Q}$ |
|---|---|---|---|---|---|---|
| 0 | 1 | X | X | X | 1 | 0 |
| 1 | 0 | X | X | X | 0 | 1 |
| 0 | 0 | X | X | X | 1 | 1 |
| 1 | 1 | ↑ | 0 | 0 | 0 | 1 |
| 1 | 1 | ↑ | 1 | 0 | toggle | |
| 1 | 1 | ↑ | 0 | 1 | $Q_o$ | $\overline{Q}_o$ |
| 1 | 1 | ↑ | 1 | 1 | 1 | 0 |
| 1 | 1 | 0 | X | X | $Q_o$ | $\overline{Q}_o$ |

Column S and R state the logic level at the set and reset inputs respectively. Column $C_K$ states the logic level and a transition at the clock input. Columns J, K state the logic level at the J and K inputs respectively. Columns Q, $\overline{Q}$ show the state of the respective outputs. In the table an X stands for an indifferent condition and the symbol ↑ for a transition from 0 to 1.

Referring now to FIG. 6, there is further shown multiplexer 17. Such multiplexer can be implemented with integrated circuits of the kind available on the market with code 74S253. This multiplexer is provided with 4 input sets (of which only 3 are used), with 2 selection inputs $S_0$ and $S_1$ and with an output control input EN. One of four input sets is selectively enabled depending on the logic level at the selection inputs. The transfer through the multiplexer is enabled by a logic level 0 present on input EN, otherwise the multiplexer outputs have a virtually infinite impedance.

Before considering the interface registers, it is advisable to consider the flip-flops which control the same. Flip-flops 40, 41 form a sequencer whose function is to generate commands, during several machine cycles, necessary to read out a microinstruction from a working memory. Flip-flops 40, 41 receive on their CK input signal STRORA (FIG. 5). The set input of flip-flop 40 is connected to the output of NAND gate 59 which receives on an input terminal a signal CSA 16, on a second input signal STADRA (FIG. 5) and on a third input signal $\overline{A}$ coming from the output $\overline{Q}$ of flip-flop 41. Signal CSA 26 is a signal present on a lead of bus 25 and represents bit 16 of control memory address. If the address is lower than 32K signal CSA 16 is at level 0. In case the address is between 32K and 64K, signal CSA 16 is at level 1. Inputs J, K of flip-flop 40 are permanently at "0". Reset input, which is normally at 1, may be dropped to "0" by an initializing reset signal RG. Flip-flop 40 is set with the rising edge of timing signal STADRA whenever during a machine cycle the control memory address is between 32K and 64K (CSA 16=1) and it is reset by signal STRORA at the beginning of the following machine cycle. When flip-flop 40 is set, a signal FLAG at output Q is at logic level 1. Output Q of flip-flop 40 is connected to inputs J, K of flip-flop 41. Flip-flop 41 is set with the rising edge of STRORA if signal FLAG was previously at logic level 1, and it is reset and maintained in reset status if FLAG was previously at logic level 0. When flip-flop 41 is set, signal A at logical level 1 is present on output Q. Signal A is applied to the timing unit as described as follows. At the beginning flip-flops 40 and 41 are reset. If, during a machine cycle (1 cycle), a control memory address between 32K and 64K is generated, flip-flop 40 is set with the first edge of signal STADRA. With the start of the subsequent cycle (2nd cycle) flip-flop 41 is set and signal A is generated on direct output Q while flip-flop 40 is reset (1st edge of signal STRORA). During the second cycle flip-flop 40 is kept in reset status, also signal CSA 16 is present owing to the masking action of signal $\overline{A}$ at logical level 0. Then, flip-flop 41 is reset with the 3 cycle start. Flip-flop status during the subsequent cycles depends on CSA 16 level again. As it will be seen infra, flip-flops 40, 41 status influences the behaviour of the interface registers. Flip-flops 43, 44, 45, 46 constitute some of the circuits which control the interface dialog. Flip-flop 43 (BURE) is used for generating signal BURE 1 on the system bus and for signalling bus requests. Its J, K inputs are permanently connected to "1". Clock input is connected to the output of OR gate 65 whose inputs are connected to the outputs of AND gate 55 and NAND gate 56. AND gate 55 receives input signals A and STRORA. NAND gate 56 receives input command VMM and timing signal STM1. Flip-flop 43 is reset by the first edge of signal ACK1 applied to the reset input. It is therefore clear that flip-flop 43 is set, when the running microinstruction requires a memory access by the second edge of signal STM1 or, when the sequencer HW is enabled and signal A is at logic level 1, by the first edge of signal STRORA. Output Q of flip-flop 43 is connected to bus lead BURE 1. Flip-flop 44 (CYG) is indicative of the bus cycle assigned to the processor. Flip-flop 44 receives a signal $\overline{DARE}$ on its clock input and signal ACK1 on its set input. $\overline{DARE}$ is obtained by inverting signal DARE of the BUS. J, K inputs of flip-flop 44 are permanently connected to 0. Flip-flop 44 (CYG) is therefore set by the first edge of signal ACK1, that is, when the BUS is assigned to the requesting processor, and it is maintained in such status up to the dropping of signal DARE (that is, up to the rising of signal $\overline{DARE}$). Signal CYGA present on the output Q of flip-flop 44 is applied to flip-flop 45, 46 as a set and reset signal respectively. Flip-flop 45 is indicative of memory write operation. A signal $\overline{ACK1}$ is applied to its clock input. J input receives, from decoder 16, command R which is indicative of a memory write operation, while input K is permanently connected to 1. The reset input receives the signal CYGA from the output Q of flip-flop 44. In case of memory write operation ($\overline{R}=1$) flip-flop 45 is set with the second edge of ACK1 and is reset with the reset of flip-flop CYG; that is, with the second edge of signal DARE. The signals QWT and $\overline{QWT}$ are available at outputs Q and $\overline{Q}$ respectively. Flip-flop 46 is indicative of a memory read operation and signal ACK1 is applied to its clock input. J input receives command R from decoder 16, which is indicative of a memory read operation, while input K is permanently connected to 1. The reset input receives signal CYGA from output Q of flip-flop 44. In case of a memory read operation (R=1) flip-flop 46 is set with the second edge of signal ACK1 and is reset with the reset of flip-flop 44 CYG; i.e., with the second edge of signal DARE. The signals $\overline{QRD}$ and QRD are available at the output $\overline{Q}$ and Q respectively of flip-flop 46. In case of memory write operation, flip-flop 46 is maintained in reset status. Flip-flop 47 constitutes a control circuit for multiplexer 17. The J, K inputs are permanently at "1". The reset input receives a signal $\overline{STADRA}$ (obtained by inversion of STADRA). The output Q of flip-flop 47 is connected to enabling input EN of multiplexer 17. Flip-flop 47 is reset with the first edge of STADRA and is set with the first edge of STRORA at the beginning of the subsequent cycle. For the time it is reset flip-flop 47 enables multiplexer 17 to the transfer of information at its outputs. The input selection of multiplexer 17 is provided by the status of flip-flops 40, 41; that is, by the hardware sequencer. Signal FLAG is applied to selecting input S1, and signal A to the selecting input S0. When signal FLAG and A are at "0", the input set at 1 is selected. When signal FLAG is at 1 while A is at 0, input set 3 is selected; and when signal FLAG is at 0 while A is at 1, input set 2 is selected. Input set 1 of multiplexer 17 is connected to channel 24; that is, it receives from the control memory a microinstruction read out from such memory. Input set 3 is permanently connected to voltage sources 1 and 0 in order to force in the multiplexer a code corresponding to a preestablished relative jump microinstruction with displacement 0. Input set 2 is directly connected to the DAC BUS. Therefore during cycles where the microinstruction is read out from the control memory instead of the working memory, being FLAG=0 and A=0, the microinstruction present in inputs 1 of the multiplexer is transferred in register ROR 15. If the microinstruction is to be read out from the working memory, FLAG is at 1, A is at 0 and in the subsequent cycle FLAG=0 and A=1: thus the jump microinstruction present on the inputs at the beginning of a first cycle and the microinstruction read out from the working memory present on DAC BUS and therefore on inputs 2 at the beginning of a second cycle are transferred in register ROR.

The interface registers are now to be considered. Register DO36 is an interface support register for data which is an output from processor towards the BUS; its output terminals are connected to DAC BUS and its input terminals to the internal bus IB. The clock input terminal of register DO36 is connected to the output of NAND gate 51 which receives as input a loading command CDO (coming from decoder 16) and the timing signal STM1 (FIGS. 4 and 5). With the second edge of STM1 register 36 is loaded with the information present on the internal bus IB when command CDO is present. Input EN of register DO is connected to the output of OR gate 49 which receives input signal $\overline{QWT}$ coming from the output $\overline{Q}$ of flip-flop 45. Such signal, when at logical level 0 (flip-flop 45 set) indicates that the running microinstruction is a memory write. The content of register 36 is therefore loaded on the DAC BUS for the entire time when flip-flop 46 is in set status; i.e., from the second edge of ACK1 to the second edge of DARE. Register ADD/COM 37 is an interface supporting register for the output addresses/commands from the processor to the BUS; its output terminals are connected to the DAC BUS, its input terminals to the internal bus IB. The clock input of register 37 is connected to the output of NAND gate 57 which receives loading command VMM as input (coming from decoder 16, FIG. 3), and timing signal STM1. Register 37 is loaded with the information present on the internal bus IB on the occurrence of second edge of STM1 when command VMM is present. The input EN of register ADD/COM is connected to the output terminal of OR gate 50 which receives input signal ACK1 (FIG. 2) and output signal A from flip-flop 41. The content of register 37 is therefore loaded on the DAC BUS during the time that ACK1 is at logic level 0—in case signal A is at logic level 0 too. Register DI38 is an interface supporting register for input data to processor from DAC BUS; its input terminals are connected to the DAC BUS and its output terminals to the internal bus IB. The clock input terminal of register DI38 is connected to the output terminal of NOR gate 67 which receives signal $\overline{\text{DARE}}$ as one input. A second input terminal is connected to the output terminal of NAND gate 63 which receives input signal QRD coming from output Q of flip-flop 46, signal A coming from output Q of flip-flop 41 and signal CYGA coming from the output Q of flip-flop 44. The information present on the DAC BUS is therefore loaded on register 38 when signal DARE rises to level 1 (and therefor $\overline{\text{DARE}}$ at 0) provided that all the conditions indicated by signals QWR, $\overline{\text{A}}$, CYGA are verified (at logic level 1). Signal QRD=1 means that the operation to be carried out when the running cycle is a read operation. Signal $\overline{\text{A}}$=1 means that the running cycle is not a cycle activated by hardware sequencer. Signal CYGA=1 means that the running bus cycle has been assigned to the processor including register 38. The enabling input EN of register 38 is connected to the output of NAND 60 which receives an input transferring command TR and timing signal STCOMA. Therefore in case transfer command TR is present, data contained in register 38 is loaded on the internal bus IB for the duration of signal STCOMA. A fourth register MA39 is provided in addition to such registers which are already known in the art. Register MA39 is an interface support register for address/commands as output from the processor towards the BUS, in case a microinstruction stored in the working memory is addressed. Its output terminals are connected to the DAC BUS and its input terminals, for a portion (24 bits) representative of memory addresses, are connected to channel 23 as output from register ROSAR internal to control memory sequencer 140 (FIG. 3). The remaining input portion 42 (8 bits) is permanently connected to ground or to the voltage corresponding to logical level 1 in order to provide register 39 with a set of commands corresponding to the memory read commands. The clock input of register 39 receives signal STREGA (FIG. 5). Hence it is charged at the end of each cycle. The EN input of register 39 is connected to the output terminal of OR 58 which receives as input signal $\overline{\text{A}}$ from the output $\overline{\text{Q}}$ of flip-flop 41, and signal ACK1. Thus register 39 loads its content on the DAC BUS only for the interval during which signal ACK1 is at 0 and only if $\overline{\text{A}}$=0; that is, in case flip-flop 42 of the hardware sequencer is set.

Before considering the system operation, it is useful to complete the description of the timing unit 14 with reference to the stop logic 33 (FIG. 4). As already discussed, stop logic 33 provides an output control signal CSTARO. If CSTARO=0 the cyclical operation of timing unit 14 stops at the end of the cycle where CSTARO=0. A new cycle starts only when CSTARO rises to 1. Stop logic 33 comprises a flip-flop 48, two NAND gates 53, 54 and a NOR gate 49. The clock input of flip-flop 48 is connected to the output of NAND gate 54. NAND gate 54 receives the signals DARE and CYGA as input. The J, K input terminals of flip-flop 48 are permanently connected to indicate 0. The set input terminal is connected to the output of NAND gate 53. An input terminal of NAND gate 53 is connected to the output terminal of OR 49 which receives the signals VMM and A as input. A signal STMI is applied to a second input terminal of NAND gate 53. The signal CSTARO is obtained from the output $\overline{\text{Q}}$ of flip-flop 48. In rest condition flip-flop 48 is reset and signal CSTARO is at 1. If during a machine cycle the signal VMM, indicative of memory enabling cycle, or the signal A indicating that the hardware sequencer is enabled, are generated, flip-flop 48 is set when signal STM1 rises to 1. The signal CSTARO falls to 0 so that the timing unit is stopped at the end of the running cycle. If signal CYGA is present flip-flop 48 is reset with the second edge of the signal DARE. With the second edge of DARE, CSTARO rises to 1 and a new machine cycle starts.

Figure 7:
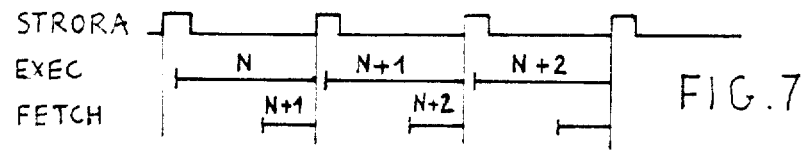
FIGS. 7 to 11 are timing diagrams of the operations performed by the system designed according to the invention.

The operation of the above-described system may now be easily understood with reference to the timing diagram of FIG. 7.

INTERNAL OPERATIONS WITH MICROINSTRUCTIONS STORED IN THE CONTROL MEMORY

Internal operations are carried out on the basis of subsequent machine cycles each controlled by a microinstruction. They do not involve the use of the BUS and of the interface unit. The execution of a microinstruction N and the fetching from control memory of the subsequent microinstruction N+1 are overlapped. Referring now to FIG. 7, diagram STRORA represents the timing pulses which start the several machine cycles. The first edge of STRORA loads into register ROR the microinstruction N, N+1, N+2 ..., which controls the execution of the operation set forth by the microinstruction (Diagram EXEC) and defines the subsequent microinstruction address. Towards the end of each cycle the address of the subsequent microinstruction is available with the first edge of the signal STADRA (FIG. 5) and such address is used to address the control memory. The read out microinstruction is available for loading register ROR at the end of the cycle and it is actually loaded into ROR with the starting of the subsequent cycle. Diagram FETCH indicates the time interval of each cycle where the reading out of the subsequent microinstruction is carried out and a reference order number for the read out microinstruction.

ACCESS OPERATIONS TO WORKING MEMORY WITH MICROINSTRUCTIONS STORED IN CONTROL MEMORY

Basically access operations are of two kinds; write or read operations.

Figure 8:
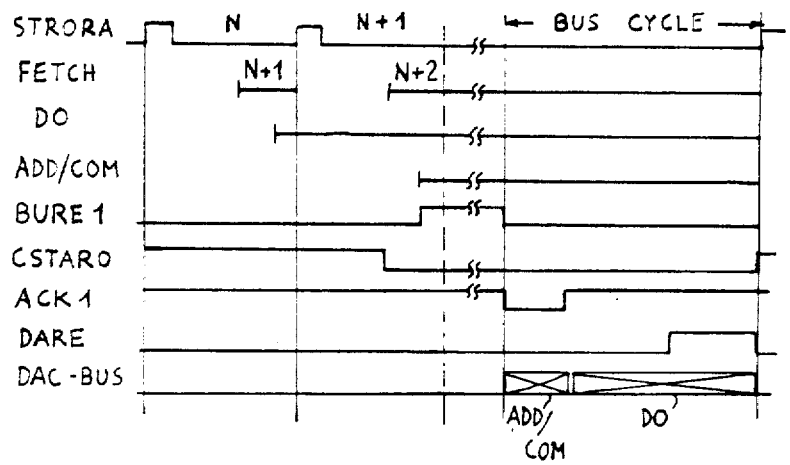

Write Operation (Shown in the diagram of FIG. 8)

During a first machine cycle N, register DO is loaded in coincidence with the second edge of STMI owing to the presence of command CDO (Diagram DO). During a second machine cycle signal CSTARO is dropped to 0 with the first edge of STMI owing to the presence of command VMM. With the second edge of STMI the register ADD/COM is loaded and signal BURE 1 is generated. At the end of the machine cycle the processor is stopped (CSTARO=0) awaiting for external events. After a certain time, which depends on the occupation status of the BUS, the processor receives, the signal ACK1 and a BUS access cycle or simply a "BUS cycle" starts, while the processor remains inactivated. The interface unit only is involved in the dialog. With the first edge of ACK1, BURE 1 is dropped to 0 while the flip-flop of assigned cycle CYG is set and the outputs of register ADD/COM are enabled till the second edge of ACK1. During such time interval the content of register ADD/COM is transferred on the DAC BUS. With the second edge of ACK1 the read cycle flip-flop WT is set. As a consequence the register DO is enabled as output and its content is transferred in the DAC BUS. CSTARO is raised again to 1 and flip-flops CYG and WT are reset with the second edge of DARE, which terminates the BUS cycle. The BUS is then released and a new machine cycle N+2 starts.

The memory write operation is therefore carried out by means of two machine cycles and one BUS cycle. During the BUS cycle the processor is inhibited. This is necessary in order to avoid interferences with the running operation and with possible subsequent operations which require the use of registers DO and ADD/COM before their content is transferred on the BUS. Such interference may be avoided by means of special circuits in case the subsequent operations controlled by microinstructions N+2, N+3, etc., are of the internal kind; that is, they do not require the use of the interface unit, but this is beyond the purposes of the invention. It is also to be noted that some elements of the interface unit are not activated during the writing operation. Particularly the HW sequencer (flip-flop 40, 41) is not activated. Multiplexer 17 enables its outputs to transfer the microinstruction present on channel 24 to register ROR at a suitable time (between the first edge of STADRA of cycle N+1 and the first edge of STADRA of cycle N+2). Also register MA 39 is inhibited, even if loaded with information, because its outputs are not enabled.

Read Operation

Figure 9:
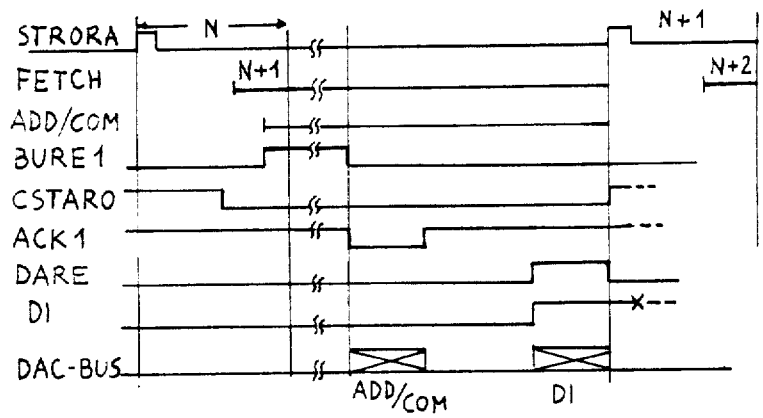

The Read Operation is shown on diagrams of FIG. 9. During a first machine cycle N signal CSTARO is dropped to 0 in coincidence with the first edge of STMI because of the presence of command VMM. The register ADD/COM is loaded with the second edge of STMI, and signal BURE 1 is generated at the same time. At the end of the machine cycle the processor is located (CSTARO=0) awaiting for external events. After a certain time, which depends on the BUS operation status, the processor receives signal ACK1 and a BUS cycle starts while the processor is still inhibited. With the first edge of ACK1 BURE 1 is reset to 0, while flip-flop CYG is set and the outputs of register ADD/COM are enabled. The content of such register is therefore transferred on the DAC BUS. With the second edge of ACK1 flip-flop RD is set. After a certain time GAM 6 makes the read out data available on the DAC BUS and generates the signal DARE. Register DI is loaded on the first edge of DARE. With the second edge of DARE, the BUS cycle terminates and the flip-flops RD, CYG are reset and CSTARO is risen again to 1. The BUS is then released and a new machine cycle N+1 starts. During such cycle (with the generation of signal STCOMA) the content of register DI is transferred to a suitable register inside the processor and, if necessary, it is handled by the unit ALU. Also in this case HW sequencer is not enabled. The operation is carried out in two machine cycles and in one BUS cycle.

Microinstructions Stored in Working Memory

It is clear that the execution of operations controlled by microinstructions stored in the working memory requires the use of the interface unit and the BUS. In turn, the operations may be of internal type or of memory access type.

Internal Operations

Figure 10:
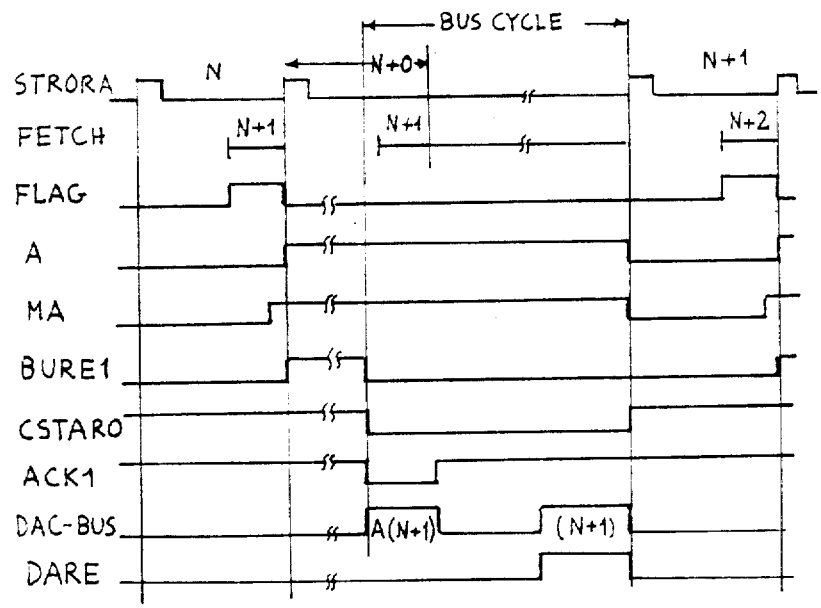

FIG. 10 shows the timing diagram of the execution and the fetching of microinstructions from working memory for internal operations. During a cycle N a microinstruction N is running; with signal STADRA the address of the subsequent microinstruction N+1 is available. If such address is higher than the control memory size, that is CSA 16=1, flip-flop FLAG is set. This causes the selection of input set 3 of multiplexer 17 so that a forced microinstruction of relative jump +0 is sent to register ROR. On the second edge of STREGA the microinstruction address A(N+1) together with forced commands for performing a memory read operation are loaded into register MA. With the beginning of the subsequent machine cycle; that is, with the first edge of STRORA, flip-flop A is set and flip-flop FLAG is reset. At the same time signal BURE 1 is generated. Concurrent to the BUS access request, a second machine cycle (N+0) starts during which the processor neither performs any useful operation nor updates the microinstruction address. On the first edge of STMI signal CSTARO is dropped to 0. On the second edge of STREGA the address A(N+1) is stored in register MA. The processor status is locked at the end of the cycle. When receiving ACK1, BURE 1 falls to 0 and register MA is enabled to transfer the microinstruction address A(N+1) and suitable forced read out commands on the DAC BUS. A bus cycle starts and the read out of microinstruction N+1 from working memory is performed. Such microinstruction is available on the DAC BUS for the entire duration of signal DARE. On the second edge of DARE the BUS cycle terminates and a new machine cycle starts. Flip-flop CYG already set is now reset. Flip-flop A is reset and CSTARO rises again to 1. On the first edge of STRORA the microinstruction present on the DAC BUS is loaded into register ROR to be executed. The operations which develop during the machine cycle N+1 depend on the subsequent microinstruction address. In case the address of microinstruction N+2 is higher than the control memory sizes—that is CSA 16=1, during the cycle N+1—the same operations already seen with reference to cycle N are carried out; i.e., flip-flop FLAG is set. On the other hand, the read out of the microinstruction occurs in the control memory. In the first case the microinstruction N is followed by a forced microinstruction of relative jump+0 (N+1+0) and by a BUS cycle for the reading out of the microinstruction of address A (N+2). Therefore it may be concluded that a microinstruction fetching from working memory and its execution require, in this case, only two machine cycles and one BUS cycle. Furthermore, in case the BUS is released, the first machine cycle (N+0) overlaps the BUS cycle, so that the operation may be actually executed in one machine cycle and one BUS cycle. This is allowed by the combined use of the register MA, which makes the address A (N+1) immediately available, at interface level since the starting of cycle N+0 and of direct channel 25 which, through multiplexer 17, makes the microinstruction N+1 immediately available to register ROR 15 for its execution, without requiring a transfer cycle from an interface register to register ROR. Without these techniques the reading out and the execution of a microinstruction stored in working memory, using the means already known in the prior art and combined together, might occur according to the following hypothetical process;

1. Running microinstruction N: indicates that address A(N+1) is a memory address and enable an HW sequencer.

2. Microinstruction N1 (forced by HW sequencer): it loads the address A(N+1) into register ADD/COM. At the end of the cycle it enables a memory read out request and locks the processor.

3. BUS cycle: register DI is loaded with the microinstruction (N+1) read out from memory.

4. Microinstruction N2 (forced by HW sequencer): it loads register ROR with the microinstruction contained in DI.

5. Microinstruction N+1 is executed. In this case the fetch and the execution of the microinstruction would require three machine cycles and a BUS cycle without any possibility of overlapping.

It is to be noted that the address A(N+1) is available during cycle N. It may be therefore asked why a BUS access request and a memory read request are not generated during cycle N. This is generally impossible as microinstruction N could be a memory access microinstruction so that at the machine cycle N, the corresponding BUS access request, could be still a pending request. The fetch of microinstruction N+1 and the related access to the BUS must be, therefore, enabled in a separate cycle when the possible previous BUS dialog is certainly finished. This consideration is important. In fact, should register ADD/COM be used to load address A (N+1) during the execution of microinstruction N (assuming that N is a memory access microinstruction) the possible previous content of ADD/COM would be lost. The loading of A(N+1) should therefore occur during the following microinstruction N1. Furthermore, in the particular case where register MA is present as in this invention, the request to access the BUS could not occur during microinstruction N because flip-flop BURE may be still set; i.e., is a BUS access request may be still a pending request.

Memory Access Operation

Figure 11:
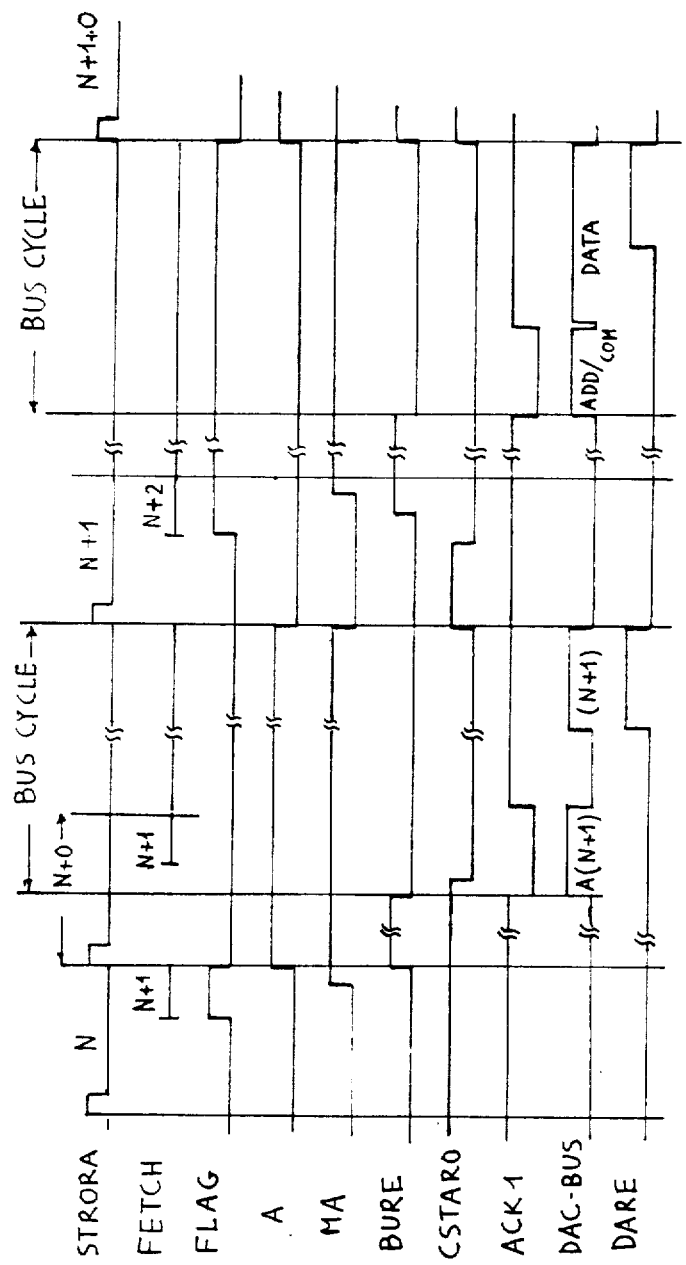

FIG. 11 shows a timing diagram of a fetching operation from working memory of a microinstruction which, in turn, controls a memory access operation. During a cycle N in which a microinstruction N is executed, the address of the subsequent microinstruction A(N+1), where CSA16=1, is available. On the first edge of STADRA flip-flop FLAG is, therefore, set involving the effects of multiplexer 17 previously observed. On the second edge of STREGA, register MA is loaded with microinstruction address A(N+1) together with forced commands of memory read. Flip-flop FLAG is reset and flip-flop A set at the starting of the subsequent machine cycle. Concurrently signal BURE 1 is generated. During this machine cycle a microinstruction of relative jump +0(N+0) forced by multiplexer 17 is executed. On the first edge of STMI signal CSTARO is dropped to 0. On the second edge of STREGA address A(N+1) is maintained in register MA. The processor status is locked by CSTARO=0 at the end of the cycle. A BUS cycle starts at the receiving of signal ACK1 which is shown, in FIG. 10, already occurring during cycle N+0. BURE 1 falls to 0 and register MA is enabled to transfer the microinstruction address A(N+1) together with suitable forced commands to the DAC BUS. With signal DARE the microinstruction N+1 read out from working memory is available on the DAC BUS. On the second edge of DARE the machine cycle N+1 starts. The Microinstruction N+1 is loaded into register ROR on the first edge of STRORA and it is executed. As such microinstruction requires a memory access, on the first edge of STMI, signal CSTARO is dropped to 0. In case the calculated address A(N+2) of the subsequent microinstruction contains CSA 16=1, signal FLAG is generated. On the second edge of STMI signal BURE 1 is generated and on the second edge of STREGA the address A(N+2) is loaded into register MA. At the reception of ACK1, a BUS cycle starts and BURE is dropped to 0. The content of register ADD/COM is transferred on the DAC BUS. On the second edge of ACK1 either flip-flop RD or WD is set depending on whether the operation is a read or write operation. In the first case, shown in FIG. 11, register DO is enabled to load its content on the DAC BUS. In the second case, with the first edge of DARE, the data present on the DAC BUS read out from memory is loaded into register DI. With the second edge of DARE, the BUS cycle ends and a cycle N+1+0 starts. In this cycle the execution of a microinstruction forced by multiplexer 17 and the read out from working memory of the subsequent microinstruction N+2, is performed. The conclusion is that in this case the reading out of a microinstruction from working memory and its subsequent execution require two BUS cycles and a machine cycle, as the cycle related to microinstruction N+0 potentially overlaps a BUS cycle. Also in this case, the possibility of operating with a reduced number of cycles is given by the presence of a direct connection between DAC BUS and ROR register and by the presence of register MA. In this case the need becomes further apparent of using register MA to avoid interferences among interface registers. In fact, during cycle N+1 the register ADD/COM is loaded with the address of the data to be read out or written into memory and it cannot be loaded with other information.

Having described a preferred form of embodiment of the invention, it must be pointed out that several changes can be made to such embodiment without departing from the invention. For instance, it has been shown that the access to working memory, for the reading out of microinstructions stored therein, is made on the basis of the logical value of address bit CSA 16 which actually constitutes the bit of weight 16 of the microinstruction address. As mentioned, this involves that the microinstructions with address included from 0 to 32K are considered as stored in the control memory and those ones with address included from 32K to 64K are considered as stored in working memory. It is, therefore, obvious that other criteria may be adopted. For instance, the selection may be effected on the basis of the OR of two or more bits of microinstruction address CSA 16, CSA 17, as well as by coupling to each microinstruction address a bit with the specific and exclusive function of identifying the memory in which the corresponding microinstruction is stored. Other variants may concern the logical components used: registers and flip-flops which are enabled by positive edges may be replaced by registers and flip-flops enabled by negative edges, corespondingly modifying the enabling logics. In regard to the BUS, some BUS receivers and transmitters which have been left out from the description for sake of simplicity, may be inserted between registers and bus.

What is claimed is:

1. An improved asynchronous bus multiprocessor system of the type in which a plurality of processors communicate with a working memory through a common system bus wherein each processor comprises:
   a first bus interface register for the latching of working memory address/commands through an internal bus,
   a second bus interface register for the latching of information read out from working memory through the internal bus,
   a microprogrammed control unit comprising: a microprogram memory, a microprogram memory address register having outputs connected to address inputs of said microprogram memory, a microinstruction register for the latching of a microinstruction read out from said microprogram memory, a first loading path from the output of said microprogram memory to the input of said microinstruction register, a decoder for microcommand generation from said microinstruction and a timing unit, wherein the improvement consists in that at least one said processor comprises:
   a third bus interface register the output of which is coupled to the system bus via the internal bus for the latching of working memory address/commands, having inputs connected to the outputs of said microprogram memory address register;
   a second loading path for said microinstruction register from said working memory through said system bus to the input of said microinstruction register;
   gate means inserted on said first and second paths to control information flow on said paths;
   a logical sequencing network which, clocked by said timing unit, when enabled by an information identifying a microinstruction addressed by said microprogram memory address register as stored in working memory, generates a sequence of microcommands, said microcommands controlling the accesss to said working memory by inhibiting said first and second interface registers and controlling said gate means to inhibit said first loading path and further enabling said third interface register and said second loading path.

2. An asynchronous bus multiprocessor system as recited in claim 1 wherein inputs to said third interface register are connected to a permanent code source, the code being representative of working memory read out commands.

3. An asynchronous bus multiprocessor system as recited in claim 1, wherein said at least one of said processors includes a third loading path of said microinstruction register through third gate means, a set of electrical signals permanently present in input to said third microinstruction code, which, once executed, does not cause any modification in the status of said at least one of said processors.

4. An asynchronous bus multiprocessor system as recited in claim 3 wherein said gate means on said first, second and third path consist of a multiplexer having its input sets connected to said first, second and third paths, the outputs of said multiplexer being connected to the inputs of said microinstruction register, said sequence of microcommands controlling said multiplexer to disconnect said first path from said third path and said second path to said multiplexer output at subsequent times.

5. An asynchronous bus multiprocessor system as recited in claim 3 wherein said logical sequencing network includes two flip-flops for the timed generation of two microcommand sets, the first of said sets enabling the loading of said microinstruction register from said third path, the second of said sets enabling a signal of memory access request to be sent to said working memory for starting a memory cycle and, at the end of the memory cycle, through which a microinstruction is read out from said working memory bus, enabling the loading of said microinstruction register from said second path.

6. An asynchronous bus multiprocessor system as recited in claim 3 wherein said one processor further includes control means for selectively requesting access to said common system bus, either at the end of a processor cycle during which said first interface register is loaded with working memory access information and commands, or at the beginning of a processor cycle next to the one during which said third interface register is loaded with working memory access information and command.

* * * * *